Jan. 14, 1936.  J. A. LAMONT  2,027,539
TRUCK
Filed Aug. 12, 1929   2 Sheets-Sheet 1

Inventor
John A. Lamont,
By Wilkinson, Huxley, Byron Knight
attys.

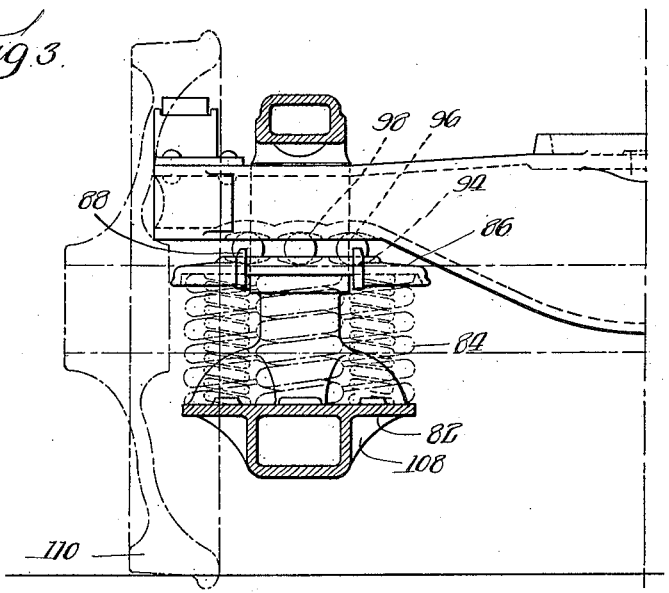
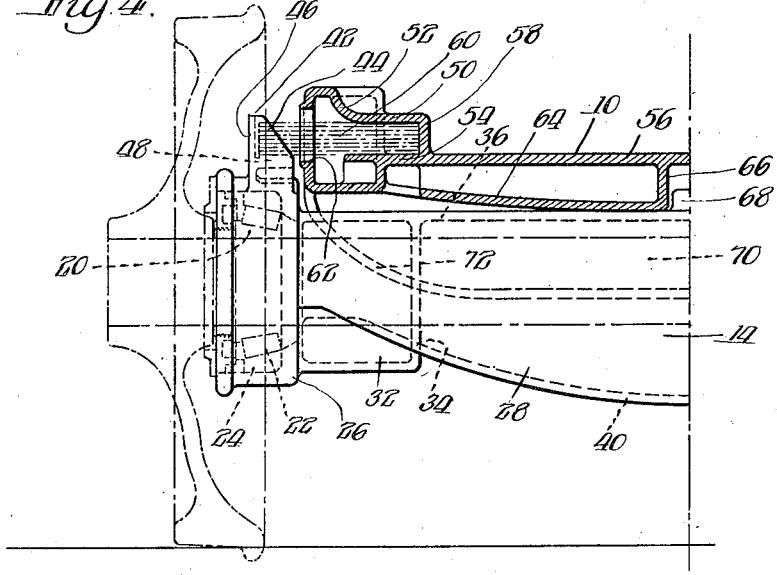

Patented Jan. 14, 1936

2,027,539

UNITED STATES PATENT OFFICE 2,027,539

TRUCK

John A. Lamont, Chicago, Ill., assignor to American Steel Foundries, Chicago, Ill., a corporation of New Jersey Application August 12, 1929, Serial No. 385,379

25 Claims. (Cl. 105—182)

This invention pertains to trucks, and more particularly to roller bearing trucks of the so-called "in-board" type.

In railway trucks, and particularly those of the so-called "in-board" type, the side roll or rocking of the vehicle body on the trucks is unusually severe under load. This rocking reaches a maximum at a certain speed, due evidently to a synchronized condition between the wheels striking the rail joints and the natural oscillation of the springs under load. The blow or pounding action delivered on the side bearings by the rocking motion results in great damage to equipment in general, and a marked tendency to take the load from the wheels on the opposite side of the truck to which the blow is concentrated, thereby causing a tipping action.

It has been the practice on center bearing trucks to allow limited clearance between the vertical body ride bearings and the truck bolster side bearings, either of the friction or roller type, in order to insure a concentration of load on the center plate, thus providing for the free swiveling of the truck on curves and also relieving the car body of some of the weaving due to minor imperfections in the roadbed. The side bearing clearance, however, has been found to aggravate the tendency of the vehicle body to rock. This rocking takes place between the center plates, but the pivot or fulcrum point of this rocking force is at the side bearings; consequently, the latter are required to absorb the resultant shock.

It is therefore an object of this invention to provide a structure which will reduce the side rolling or rocking of railway cars or the like.

Another object of the invention is to provide a truck and bolster construction embodying a novel bolster and side bearing arrangement adapted to reduce side rolling or rocking to meet all requirements of service and manufacture.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 3 is a fragmentary transverse sectional elevation of the truck assembly, the same being taken substantially in the plane as indicated by the line 3—3 of Figure 2; and Figure 4 is a fragmentary transverse sectional elevation of the truck assembly, the same being taken substantially in the plane as indicated by the line 4—4 of Figure 1.

Figure 1:
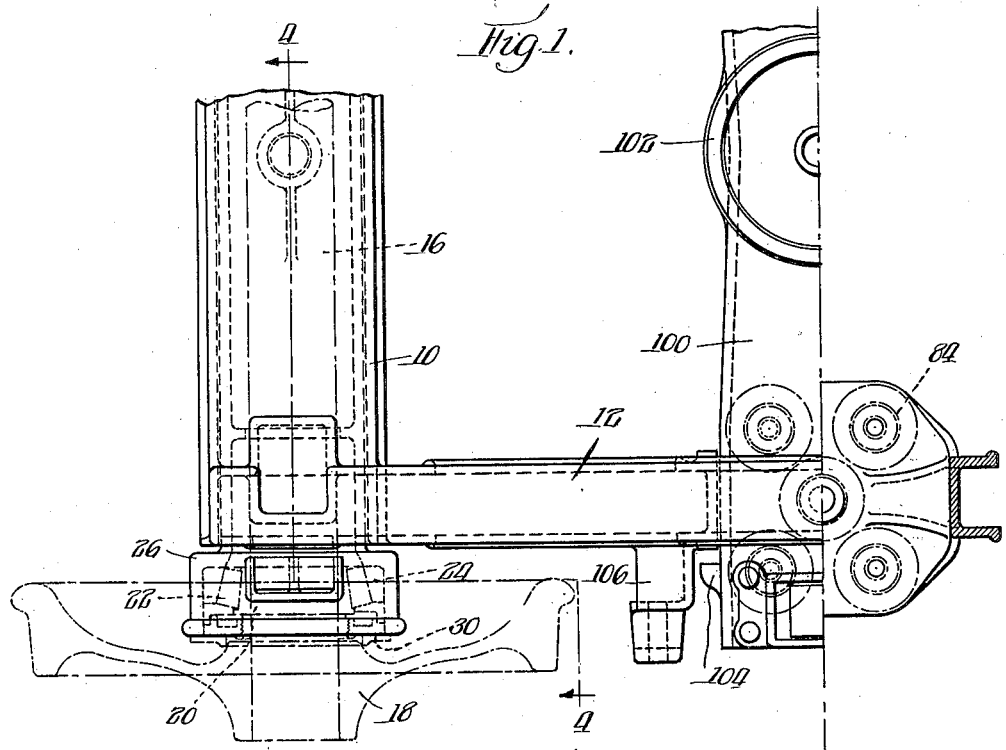
Figure 1 is a fragmentary partially sectional top plan view of a truck assembly embodying the invention.
Figure 2:
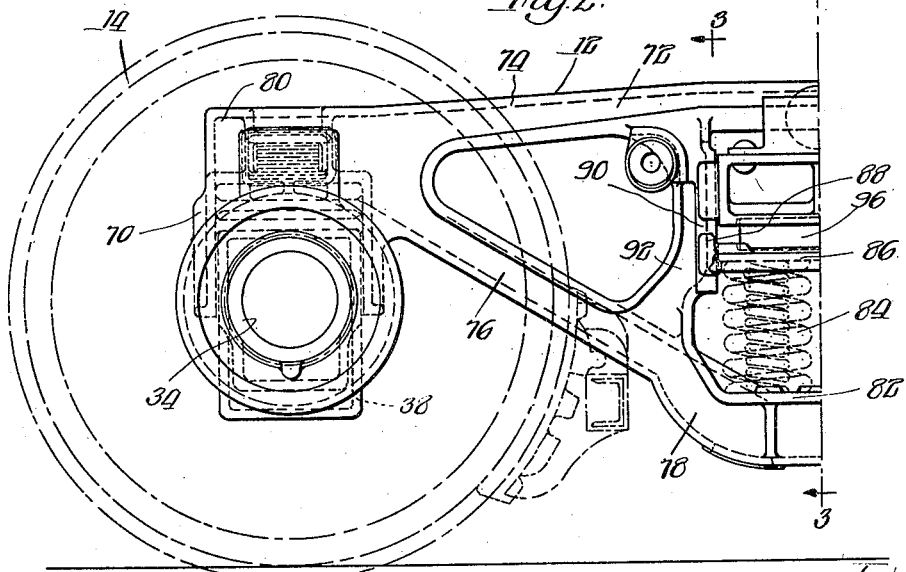
Figure 2 is a fragmentary side elevation of the truck assembly illustrated in Figure 1.

The truck assembly consists essentially of a combination frame and end-bolster or bolster casting 10, integrally formed at the ends thereof with longitudinally extending side frames 12, said side frames being supported by wheel and axle assemblies 14. The wheel and axle assemblies include an inner rotary axle 16 provided at the ends thereof with wheels 18 press fitted or otherwise secured thereon, said axles being provided with suitable race rings 20 disposed between the wheels 18 and the side frame 12 and having bearing relation with rollers 22, said rollers having bearing relation with race rings 24 disposed in the outer enlarged substantially circular portions 26 of the outer axle or housing 28. It will therefore be seen that in effect the bearings are disposed in a bearing recess in the outer non-rotatable axle, said recess being closed by a suitable dust or cover plate 30 provided for retaining the lubricant in the bearing recess. The bearing recess communicates with a bottom recess or member 32 provided on the axle, which recess is offset downwardly from the axle 28 to provide an oil pocket, and flanges 34 are provided at the inner end of said pocket for attaching a packing ring to more perfectly separate the pocket from the remaining or middle portion of the outer axle.

The outer axle 28 is preferably a casting in the conventional bolster shape, being substantially rectangular in section, having flat top members 36 and straight side portions 38, the bottom member 40 being depressed or curved to provide the greatest depth of axle adjacent the center whereby a substantially catenary shape of axle is formed to more effectively resist the maximum bending moment at the center section of said axle assembly. The outer enlarged portion 26 is provided adjacent the top thereof with a bracket 42 opening or facing toward the side frame 12, said bracket including end members 44, a connecting wall or side portion 46, and a bottom member 48 having an arcuate upper surface.

The bolster 10 is provided with a bracket arrangement 50 disposed adjacent the bracket 42 and opening toward said bracket, said bracket 50 being of substantially cage shape, provided with an upper wall 52 and a lower wall 54 in substantial alignment with the upper wall 56 of said bolster, the upper and lower walls 50 and 54 being joined by an end wall 58 forming a pocket for the reception of a plurality of flexible snubbing plates 60, held in said pocket and extending through the aperture 62 provided in the bracket and into the pocket 42, being supported on or in contact with the arcuate wall 48.

The bolster 10 has a lower substantially arcuate wall 64 extending from the bracket 50, having its greatest depth adjacent the longitudinal center line of the truck assembly, being formed with a positioning socket 66 having cooperative relation with the upwardly extending boss 68 formed on the axle 28. The bolster 10 is also provided with depending members or skirted portions 70, downwardly extending on either side of the axis 28 and having positioning engagement therewith, the members 70 being shown as curved adjacent their ends, as at 72, to merge into the side frames 12.

The side frames include an upper compression member 72 having downwardly extending portions 74 merging into upwardly extending portions 76 of the tension member 78, the merged portions of the tension and compression members of the side frame being carried over the axle assemblies and merging into and being integral with the bracket members 50, as at 80. The tension member is provided with spring seats 82 for supporting a nest of springs 84, said springs being provided with members 86 forming spring caps, said members having guide or stop members 88 and having sliding engagement with the column guides 90 provided on the columns 92, which columns are disposed between the tension and compression members. The members 86 are also provided with a plurality of local races 94 for the reception of rollers 96 having bearing relation with similar races 98 disposed on the transverse bolster 100, said races forming means providing limited relative movement between the side frames and the bolsters 100. The bolster 100 is provided with the center plate 102 and suitable stops 104 for limiting the side swing of said bolster, said bolster having vertical sliding relation with the guides 90.

The side frame is also provided with suitable brackets 106 for the usual brake hangers. The member 86 is extended transversely of the truck, being substantially the same width as the spring supporting member 82, which is braced to the side frame by means of gussets or brackets 108. In this construction, the wheels are so arranged with the remainder of the assembly that the point of contact between the tire 110 and the rail is closely adjacent a vertical plane through the bearings so that the load is carried nearly directly in a vertical line.

In operation, it will be seen that the snubber plates 60, through their bending and frictional resistance, serve as effective snubbers to the tendency of the car to roll due to irregularities in the track, and that they are proportioned to permit vertical freedom to the ends of the axle, which motion is not however transmitted to the bolster 10 as the bolster bears on the axle 28 adjacent the center thereof, which is a neutral part of the axle and therefore is relatively more or less free from the vertical movements of the wheels which follow the track or roadbed. As a result, the vertical movement of the wheel is not transmitted to the springs 84 as would happen if the side frame members rested directly on the axle, so that therefore the springs 84 are relieved of a great deal of stress, and the tendency of the car to side roll is consequently greatly reduced and the quick heavy loads are not imposed on the bearings.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck for railway rolling stock, the combination of a truck frame, wheel and axle assemblies supporting said frame, said assemblies each including a non-rotatable axle having sliding cooperation with said truck frame, and snubber plates disposed as a cantilever between said non-rotatable axle and said frame.

2. In a truck for railway rolling stock, the combination of a truck frame, wheel and axle assemblies supporting said frame, said assemblies each including a non-rotatable axle, and snubber plates disposed transversely of the truck as a cantilever between said non-rotatable axle and said frame at points above said axle.

3. In a truck for railway rolling stock, the combination of a truck frame, wheel and axle assemblies supporting said frame, said assemblies each including a wheeled rotary axle and a non-rotatable axle, and snubber plates disposed transversely of the truck as a cantilever between said non-rotatable axle and said frame.

4. In a truck for railway rolling stock, the combination of a truck frame, wheel and axle assemblies supporting said frame, said assemblies each including a wheeled rotary axle and a non-rotatable axle, and snubber plates disposed transversely of the truck as a cantilever between said non-rotatable axle and said frame at points above said rotary axle.

5. In a truck for railway rolling stock, the combination of a truck frame, wheel and axle assemblies supporting said frame, said assemblies each including a wheeled rotary axle and a non-rotatable axle, and snubber plates disposed transversely of the truck as a cantilever between said frame and one of said axles.

6. In a truck for railway rolling stock, the combination of a truck frame, wheel and axle assemblies supporting said frame, said assemblies each including a wheeled rotary axle and a non-rotatable axle, and snubber plates disposed transversely of the truck as a cantilever between said frame and one of said axles at points above said rotary axle.

7. In a wheel and axle assembly, the combination of an outer relatively stationary axle, an inner wheeled axle extending therethrough, said outer axle having enlarged bearing portions disposed on the ends thereof, bearings disposed in said portions and cooperating with said inner axle, offset pocket forming portions disposed in said outer axle and communicating with said bearing portions, and a substantially catenary shaped portion formed on said axle between said bearing portions.

8. In a wheel and axle assembly, the combination of an outer relatively stationary axle, an inner wheeled axle extending therethrough, said outer axle having enlarged bearing portions disposed on the ends thereof, bearings disposed in said portions and cooperating with said inner axle, and a substantially catenary shaped portion formed on said axle between said bearing portions.

9. In a truck, the combination of a truck frame having end bolsters, wheel and axle assemblies supporting said frame, said assemblies each including a non-rotatable axle, said truck frame having each end bolster engaging one of said non-rotatable axles along an arcuate surface.

10. In a truck, the combination of a truck frame having spaced bolsters, wheel and axle assemblies supporting said frame, said assemblies each including a non-rotatable axle, said truck frame having each bolster engaging one of said non-rotatable axles along an arcuate surface, and means on each of said axles engaging complementary means on each of said bolsters for positioning said truck frame and axle assemblies.

11. In a truck, the combination of a truck frame having end bolsters, wheel and axle assemblies supporting said frame, said assemblies each including a non-rotatable axle, said truck frame having each bolster engaging one of said non-rotatable axles along an arcuate surface, and snubbing means disposed between each of said last named axles and said frame.

12. In a truck, the combination of a truck frame having end bolsters, wheel and axle assemblies supporting said frame, said assemblies each including a non-rotatable axle, said truck frame having each bolster engaging one of said non-rotatable axles along an arcuate surface, means on each of said axles engaging complementary means on each of said bolsters for positioning said truck frame and axle assemblies, and snubbing means disposed between each of said last named axles and said frame.

13. In a truck, the combination of a truck frame having end bolsters, wheel and axle assemblies supporting said frame, said assemblies each including a non-rotatable axle, said truck frame having each bolster engaging one of said non-rotatable axles along an arcuate surface, said bolsters and said last named axle having bracket portions, and snubbing means disposed in said bracket portions.

14. In a truck, the combination of a truck frame having end bolsters, wheel and axle assemblies supporting said frame, said assemblies each including a non-rotatable axle, said truck frame having each bolster engaging one of said non-rotatable axles along an arcuate surface, said bolsters and said last named axle having bracket portions, one of said bracket portions having an arcuate support, and snubbing plates disposed between said bracket portions and engaging said arcuate support.

15. In side frame construction, the combination of spaced side frames, end bolsters integrally formed therewith, said bolsters having an arcuate axle engaging portion.

16. In a railway truck, the combination of a truck frame having a bolster integral therewith, and a wheel and axle assembly including a non-rotatable axle, said bolster having an arcuate surface engaging said non-rotatable axle.

17. In a truck for railway rolling stock, the combination of a truck frame, wheel and axle assemblies supporting said frame, and resilient means disposed transversely of the truck as a cantilever between said wheel and axle assemblies and said frame.

18. In a railway truck, the combination of a truck frame including spaced side frames and connecting members, a bolster supported on said truck frame intermediate said connecting members, wheel and axle assemblies supporting said truck frame by engagement with said connecting members, and resilient means between said truck frame and said wheel and axle assemblies.

19. In a railway truck, the combination of a truck frame, wheel and axle assemblies supporting said truck frame, a bolster supported on said truck frame intermediate said wheel and axle assemblies, the parts being so constructed that the loads will normally be transmitted to said wheel and axle assemblies adjacent the longitudinal center line of said truck frame, and means for maintaining said truck frame in normal position.

20. In a railway truck, the combination of a truck frame, wheel and axle assemblies supporting said truck frame, a bolster supported on said truck frame intermediate said wheel and axle assemblies, the parts being so constructed that the loads will normally be transmitted to said wheel and axle assemblies adjacent the longitudinal center line of said truck frame, and resilient means disposed between said wheel and axle assemblies and said truck frame for maintaining said truck frame in normal position.

21. In a truck, the combination of spaced side frames having end connecting members provided with a rocker surface on the under side thereof and depending skirted portions on each side of said rocker surface, spring housings disposed in said side frames and connecting members, spaced wheel and axle assemblies, said wheel and axle assemblies each including an inner normally rotatable axle provided with wheels disposed outwardly of said side frames, an outer normally stationary axle disposed between said skirted portions and supporting said spaced members intermediate said side frames on said rocker surface, bearings between said axles, said outer axle having spring seats aligned with said spring housings, and spring means disposed between said spring seats and spring housings and resiliently maintaining said side frames against rocking movement on said rocker surfaces.

22. In a truck, the combination of spaced side frames, a transverse member connecting said side frames, a wheel and axle assembly disposed between said side frames, said transverse member being provided with a rocking surface engaging a portion of said wheel and axle assembly intermediate said side frames whereby said transverse member is rockably supported thereon, and resilient means disposed between said wheel and axle assembly and said transverse member for resiliently resisting rocking movement.

23. In a truck, the combination of spaced side frames, a transverse member connecting said side frames, a wheel and axle assembly disposed between said side frames, said transverse member being provided with a rocking surface engaging a portion of said wheel and axle assembly intermediate said side frames whereby said transverse member is rockably supported thereon, and resilient means disposed between said wheel and axle assembly and said side frames for resiliently resisting rocking movement.

24. In a railway car, the combination of a car body, a truck, spaced wheel and axle assemblies for supporting said truck, said truck including spaced side frames, a bolster resiliently supported on said side frames and adapted to support said car body, means disposed adjacent each end of said side frames associated with said wheel and axle assemblies and movable with respect to said car body and interposed between said car body and wheel and axle assembly, said means having arcuate surfaces for rockably supporting said car body with respect to said wheel and axle assemblies, and cantilever stabilizing springs interposed between said movable means and wheel and axle assemblies.

25. In a railway truck, the combination of a truck frame having a bolster member integral therewith, a wheel and axle assembly including a non-rotatable axle member, one of said members having an arcuate surface engaging the other of said members, and snubbing means disposed between said members.

JOHN A. LAMONT.